United States Patent
Nambiar et al.

(10) Patent No.: US 10,417,029 B2
(45) Date of Patent: Sep. 17, 2019

(54) VIRTUAL MACHINE MIGRATION

(71) Applicant: Hewlett-Packard Development Company, L.P., Fort Collins, CO (US)

(72) Inventors: Padmaja C Nambiar, Bangalore (IN); Fredrik Tarnell, Stockholm-Solna (SE); Dave Olker, Rocklin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 572 days.

(21) Appl. No.: 14/816,062

(22) Filed: Aug. 3, 2015

(65) Prior Publication Data
US 2017/0039079 A1     Feb. 9, 2017

(51) Int. Cl.
| | |
|---|---|
| *G06F 9/455* | (2018.01) |
| *G06F 11/34* | (2006.01) |
| *G06F 3/06* | (2006.01) |
| *H04L 12/24* | (2006.01) |

(52) U.S. Cl.
CPC ...... *G06F 9/45558* (2013.01); *H04L 41/0896* (2013.01); *G06F 3/0617* (2013.01); *G06F 9/45533* (2013.01); *G06F 11/3433* (2013.01); *G06F 2009/4557* (2013.01); *G06F 2009/45595* (2013.01)

(58) Field of Classification Search
CPC ...... G06F 3/0607; G06F 9/52; G06F 9/45558; G06F 9/5077; H04L 67/1097
See application file for complete search history.

(56) References Cited

U.S. PATENT DOCUMENTS

| | | | | |
|---|---|---|---|---|
| 7,590,746 | B2 * | 9/2009 | Slater | H04L 41/0896 709/226 |
| 8,626,967 | B1 * | 1/2014 | Naik | G06F 13/14 710/31 |
| 8,705,351 | B1 | 4/2014 | McGlaughlin et al. | |
| 8,898,507 | B1 | 11/2014 | Crable et al. | |
| 8,949,656 | B1 * | 2/2015 | Ninan | G06F 11/2005 714/4.1 |
| 9,329,906 | B2 * | 5/2016 | Shah | G06F 9/5077 |
| 9,521,085 | B1 * | 12/2016 | Watson | H04L 67/1097 |
| 10,015,266 | B1 * | 7/2018 | Shavell | H04L 67/148 |
| 2004/0047354 | A1 * | 3/2004 | Slater | H04L 41/0896 370/400 |

(Continued)

OTHER PUBLICATIONS

QLogic. "Fibre Channel NPIV Storage Networking for Windows Server 2008 R2 Hyper-V and System Center VMM2008 R2", Feb. 2010. QLogic—Microsoft Virtualization. pp. 2-1 to 4-19.*

(Continued)

*Primary Examiner* — Lewis A Bullock, Jr.
*Assistant Examiner* — Gilles R Kepnang

(57) ABSTRACT

The present subject matter relates to migration of virtual machines. In an example implementation, a FC port of a hypervisor is identified, where the FC port has the same label as a label associated with a source FC port supporting a virtual initiator port of a virtual machine (VM) on a source hypervisor. The same label is indicative of at least same bandwidth availability on the source FC port and the destination FC port, and same FC fabric to which the source FC port and the destination FC port are connected. The virtual initiator port of the VM is placed on the identified FC port to migrate the VM from the source hypervisor to the hypervisor.

17 Claims, 6 Drawing Sheets

(56) References Cited

U.S. PATENT DOCUMENTS

| | | | |
|---|---|---|---|
| 2009/0025007 A1 | 1/2009 | Nara et al. | |
| 2010/0228840 A1* | 9/2010 | Bose | H04L 67/1097 709/221 |
| 2010/0250785 A1 | 9/2010 | Shin et al. | |
| 2011/0044344 A1* | 2/2011 | Hudson | H04L 12/433 370/395.53 |
| 2011/0110381 A1* | 5/2011 | Atkinson | H04L 47/125 370/419 |
| 2011/0138384 A1* | 6/2011 | Bozek | H04L 41/0806 718/1 |
| 2011/0153715 A1* | 6/2011 | Oshins | G06F 9/5088 709/203 |
| 2012/0011240 A1* | 1/2012 | Hara | G06F 3/0607 709/223 |
| 2012/0131300 A1* | 5/2012 | Graham | G06F 9/5077 711/170 |
| 2012/0230196 A1* | 9/2012 | Jain | H04L 47/724 370/235 |
| 2012/0297379 A1* | 11/2012 | Anderson | G06F 9/45558 718/1 |
| 2013/0024639 A1* | 1/2013 | Yamamoto | G06F 3/0617 711/165 |
| 2013/0110966 A1* | 5/2013 | Nagami | H04L 47/125 709/214 |
| 2013/0152083 A1* | 6/2013 | Miki | G06F 9/5077 718/1 |
| 2013/0263130 A1* | 10/2013 | Sugihara | G06F 9/455 718/1 |
| 2013/0298126 A1* | 11/2013 | Nakagawa | G06F 9/455 718/1 |
| 2013/0318228 A1* | 11/2013 | Raja | G06F 3/0635 709/224 |
| 2014/0036675 A1* | 2/2014 | Wang | G06F 9/52 370/235 |
| 2015/0055474 A1* | 2/2015 | Eyada | H04L 67/1004 370/235 |
| 2015/0109076 A1* | 4/2015 | Lu | H04L 49/00 333/260 |
| 2015/0277958 A1* | 10/2015 | Tanaka | G06F 9/45558 718/1 |
| 2016/0119188 A1* | 4/2016 | Kumbhari | H04L 49/90 370/400 |
| 2017/0315836 A1* | 11/2017 | Langer | H04L 43/0882 |

OTHER PUBLICATIONS

Virtual Fibre Channel for Hyper-V—Search Results.

\* cited by examiner

VIRTUAL MACHINE MIGRATION

BACKGROUND

An N-port ID virtualization (NPIV) based storage network environment involves a fibre channel (FC) protocol that allows for creation of multiple virtual initiator ports, each with a unique worldwide name as an identifier. The virtual initiator ports, also referred to as a NPIV virtual host bus adaptors (HBAs), can be associated with a virtual machine (VM) on a physical computing system, for example, a server. The virtual initiator ports of the VM can be supported by one or more physical FC ports through which the VM can communicate with devices in the storage network environment. With NPIV in the storage network environment, the VMs along with the associated virtual initiator ports can migrate from one physical computing system to another physical computing system to transfer the workload between the physical computing systems.

BRIEF DESCRIPTION OF DRAWINGS

The following detailed description references the drawings, wherein.

DETAILED DESCRIPTION

Figure 1:
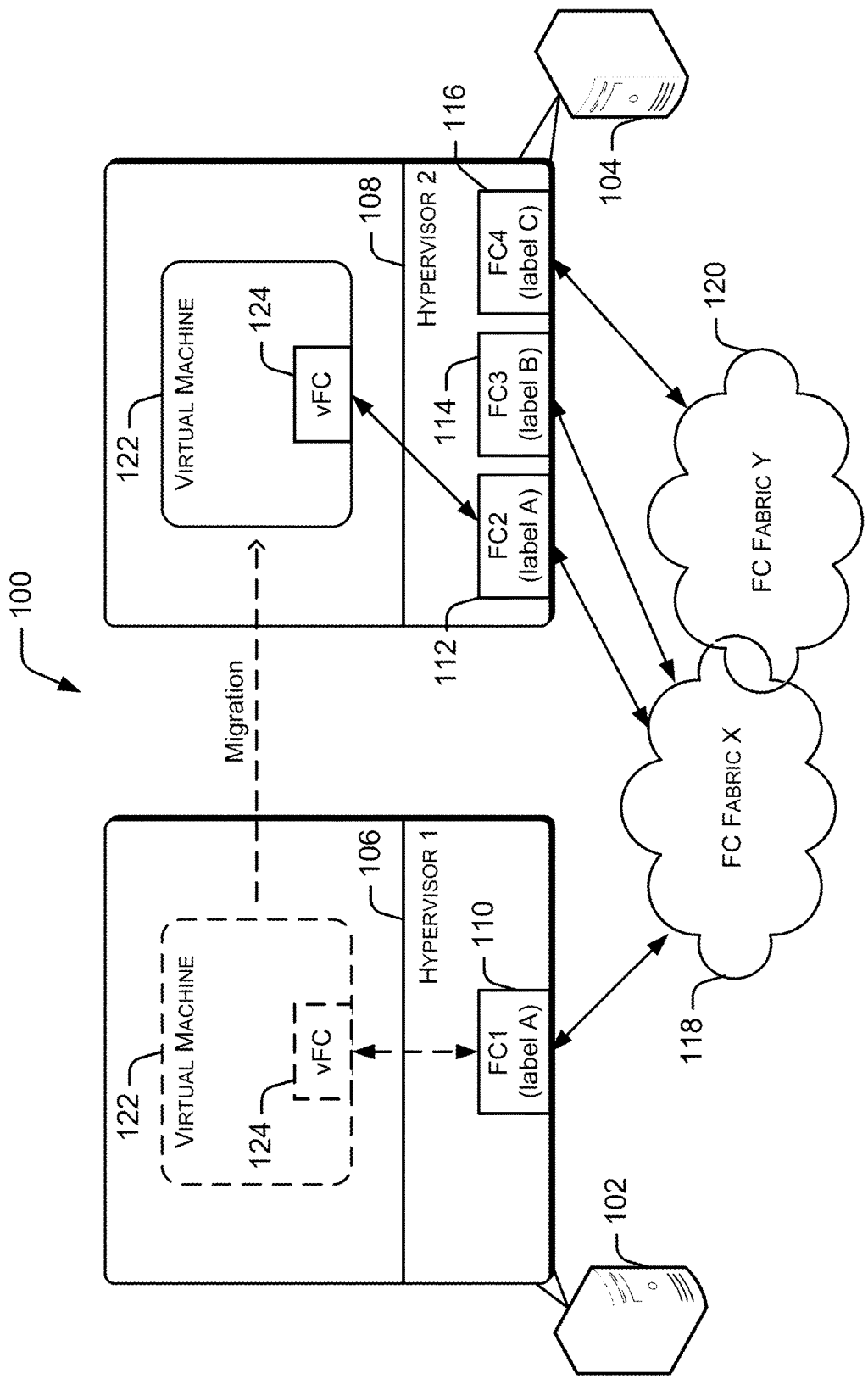
FIG. 1 illustrates virtual machine (VM) migration in a storage network environment, according to an example implementation of the present subject matter.

The present subject matter describes migration of virtual machines (VMs) in an N-port ID virtualization (NPIV) based storage network environment, for example, a storage area network (SAN).

The NPIV based storage network environment may include a plurality of physical computing systems, such as servers. Each physical computing system may include a hypervisor to manage VMs for accessing and storing data in the storage network environment. With NPIV, a VM on the hypervisor is associated with one or more virtual initiator ports. The virtual initiator ports associated with the VM can be supported by, or linked with, a physical fibre channel (FC) port to enable the VM to communicate with other components in the storage network environment. The physical FC port is hereinafter interchangeably referred to as the FC port. For the communication of the VM, the FC port is connected to a FC fabric. The FC fabric may include one or more devices, such as FC switches.

NPIV in the storage network environment allows for workload mobility, in which VMs along with the virtual initiator ports associated with the VMs on a hypervisor of one physical computing system can be migrated to a hypervisor of another physical computing system. A VM is generally migrated from a source hypervisor to a destination hypervisor such that the virtual initiator ports of the migrating VM are placed on a FC port of the destination hypervisor that is connected to the same FC fabric as the FC port of the source hypervisor supporting the virtual initiator ports. The FC port of the source hypervisor may be referred to as the source FC port, and the FC port of the destination hypervisor may be referred to as the destination FC port. The mechanism of migrating the VM between the source FC port and the destination FC port connected to the same FC fabric does not provide a control or predictability regarding the specific destination FC port on which the virtual initiator ports are placed on after migration of the VM. With this mechanism, if multiple destination FC ports, for example, with different bandwidth characteristics, are identified to be connected to the same FC fabric as that for the source FC port, the virtual initiator ports of the migrating VM may get placed on a lower bandwidth or an undesirable destination FC port. The placement of the virtual initiator ports of the migrating VM on the lower bandwidth or undesirable destination FC port may adversely affect the performance of the VM in the storage network environment.

The present subject matter describes methods and systems for VM migration between hypervisors in a NPIV based storage network environment. The methods and the systems of the present subject matter facilitate in providing control and predictability with respect to placement of virtual initiator ports of a migrating VM on desirable FC ports. With the methods and the systems of the present subject matter, the virtual initiator ports of the migrating VM can be predictably placed on the destination FC ports with similar performance characteristics or availability, such as bandwidth availability, as that for the source FC ports. This helps in achieving SAN-level isolation of the VMs and maintaining the performance and throughput for the VMs in the storage network environment.

In accordance with an example implementation of the present subject matter, labels are assigned to FC ports across hypervisors of physical computing systems. In an example, the FC ports, across different hypervisors, at least with the same bandwidth availability and connection to the same FC fabric are assigned the same label. In an example, the FC ports with at least one of the same speed, the same vendor, and the same load-based priority may also be assigned the same label. A label may be a tag, for example, an alphanumeric name, that groups together, and uniquely identifies, the FC ports with the same connectivity and performance characteristics or availability, as mentioned above.

In an example implementation, for migration of a VM from a source hypervisor to a destination hypervisor, a label associated with a source FC port supporting a virtual initiator port of the VM on the source hypervisor is identified. Based on the identification of the label, a destination FC port that has the same label as the label associated with the source FC port is identified. After identifying the destination FC port with the same label, the virtual initiator port of the VM is placed on the identified destination FC port. As mentioned above, the destination FC port and the source FC port having the same label indicates that the destination FC port at least has the same bandwidth availability and is connected to the same FC fabric as those for the source FC port. Thus, the migration of the VM between the FC ports with the same labels helps in predictably placing the virtual initiator port on the destination FC port with the same connectivity and performance characteristics or availability as that for the source FC port.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates VM migration in a storage network environment 100, according to an example implementation of the present subject matter. As shown in FIG. 1, the storage network environment 100 includes host computing system 1, referenced by 102, and host computing system 2, referenced by 104. Host computing system 1, referred hereinafter as system 1 102, includes hypervisor 1 106 that creates and manages VMs on system 1. Similarly, host computing system 2, referred hereinafter as system 2 104, includes hypervisor 2 108 that creates and manages VMs on system 2. Each of system 1 102 and system 2 104 respectively includes one or more processors (not shown). Hypervisor 1 106 and hypervisor 2 108 are coupled to the processor(s) of system 1 and system 2, respectively, to perform functions for the migration of VMs in accordance with the present subject matter. It may be noted that, for the sake of simplicity, only two host computing systems, system 1 and system 2, are shown in the storage network environment 100; however, the storage network environment 100 may include more than two host computing systems.

The processor(s) may be implemented as microprocessors, microcomputers, microcontrollers, digital signal processors, central processing units, state machines, logic circuitries, and/or any devices that manipulate signals based on operational instructions. Among other capabilities, the processor(s) may fetch and execute computer-readable instructions stored in a memory coupled to the processor(s) of system 1 and system 2. The memory can be internal or external to system 1 and system 2. The memory may include any non-transitory computer-readable storage medium including, for example, volatile memory (e.g., RAM), and/or non-volatile memory (e.g., EPROM, flash memory, NVRAM, memristor, etc.).

Further, each of system 1 102 and system 2 104 includes one or more FC ports associated with the respective hypervisor, each FC port being connected to a FC fabric. As shown in FIG. 1, system 1 102 includes one FC port, namely FC1 110, associated with hypervisor 1 106, and system 2 104 includes three FC ports, namely FC2 112, FC3 114, and FC4 116, associated with hypervisor 2 108. FC1 110, FC2 112, and FC3 114 are connected to FC fabric X 118, and FC4 116 is connected to FC fabric Y 120. FC fabric X 118 and FC fabric Y 120 overlap each other, as shown in FIG. 1. Thus, FC fabric X 118 and FC fabric Y 120 are part of the same FC fabric. It may be noted that one FC port and three FC ports are shown for system 1 and system 2 as an example; however, system 1 and system 2 may include any number of FC ports.

The FC ports across hypervisor 1 106 and hypervisor 2 108 are assigned with labels. A label may be a tag, for example, an alpha-numeric name. The labels may be assigned by a system administrator. In an example, the same label is assigned to the FC ports, across different hypervisors, which at least have the same bandwidth availability and are connected to the same FC fabric. Consider a case where FC1 110 and FC2 112 have the same high bandwidth availability, and FC3 114 and FC4 116 have different and lower bandwidth availability. Since FC1 110 and FC2 112 are connected to FC fabric X and have the same bandwidth availability, they are assigned the same label, for example, "label A", as shown. FC3 114, however, in spite of being connected to FC fabric X, is assigned a different label, for example, "label B", as shown, since it has a lower bandwidth availability. Further, FC4 116 is connected to FC fabric Y, and is assigned another label, for example, "label C", as shown, as it has a different bandwidth availability than that for FC1, FC2, and FC3.

Further, in an example, two or more FC ports across the hypervisors may also be assigned the same label when at least one of the speed, the vendor, and the load-based priority, associated with the FC ports is the same. The load-based priority of a FC port may indicate whether the FC port is to be reserved for a critical load over the SAN, a backup load over the SAN, a test load over the SAN, and such.

The description below describes the procedure of migration of a VM 122 from hypervisor 1 106 of system 1 to hypervisor 2 108 of system 2 based on the labels assigned to the FC ports, in accordance with an example implementation of the present subject matter. Consider a case where the VM 122 on hypervisor 1 106 is associated with a virtual initiator port, namely vFC 124. The vFC 124 of the VM 122 is supported by FC1 110. For the purpose of description herein, hypervisor 1 106 may be referred to as the source hypervisor, FC1 110 may be referred to as the source FC port, hypervisor 2 108 may be referred to as the destination hypervisor, and FC2 112, FC3 114, and FC4 116 may be referred to as the destination FC ports.

For migration of the VM 122 from hypervisor 1 to hypervisor 2, hypervisor 1 may send information of the migrating VM 122 and the vFC 124, and the label associated with the source FC port, i.e., FC1 110, to hypervisor 2. The information and the label of FC1 110 received by hypervisor 2 may be stored in a memory (not shown) of system 2.

In an example implementation, hypervisor 2 identifies the label associated with FC1 110. Hypervisor 2 then identifies at least one eligible FC port among a plurality of FC ports in hypervisor 2, where the at least one eligible FC port has the same label as the identified label. After identifying at least one eligible FC port, hypervisor 2 places the vFC 124 of the VM 122 on one of the eligible FC port to migrate the VM 122 from hypervisor 1 to hypervisor 2.

With the example implementation shown in FIG. 1, hypervisor 2 108 identifies label A as the label associated with FC1 110. Based on the label, hypervisor 2 108 identifies FC2 112 as the eligible FC port having the same label as label A. Thus, hypervisor 2 108 places the vFC 124 of the VM 122 on FC2 112 to migrate the VM 122, as shown in FIG. 1.

By placing the vFC 124 on FC2 112 having the same label as FC1 110, the VM 122 is migrated to a destination FC port that is connected to the same FC fabric and has the same bandwidth availability as that for a source FC port prior to migration. Thus, the VM 122 prior to and after the migration can experience and provide a similar performance.

In an example implementation, hypervisor 2 determines connectivity of FC2 112 to FC fabric X 118 prior to placing the vFC 124 of the VM 122 on FC2 112. The connectivity of the FC2 112 to FC fabric X 118 is determined to check that whether the FC2 112 is actually connected to the same FC fabric as that connected with the FC1 110. If FC2 112 is not actually connected to FC fabric X 118, then the vFC 124 is not placed on FC2 112. This determination helps in preventing placement of a virtual initiator port on a destination FC port in case the destination Fc port is assigned an incorrect label with respect to connectivity to the same FC fabric.

Further, in an example implementation, in case two or more FC ports in hypervisor 2 are identified as eligible FC ports, hypervisor 2 may place the vFC 124 of the VM 122 on one of the eligible FC ports that has a minimum number of previously placed and active virtual initiator ports. Thus, the vFC of the migrating VM is placed on a destination FC port that is least loaded with virtual initiator ports. Such placement of the vFC substantially ensures even distribution of workloads on the eligible destination FC ports for the migrating VMs.

Further, in an example implementation, consider a case where a migrating VM is associated with at least two virtual initiator ports supported by one or more source FC ports on the source hypervisor, and at least two destination FC ports in the destination hypervisor are identified as eligible destination FC ports having the same label as that for the one or more source FC ports. In this case, the destination hypervisor may place the at least two virtual initiator ports on the at least two identified eligible destination FC ports such that the same identified eligible destination FC port is not consecutively assigned to the at least two virtual initiator ports. This example implementation is explained and illustrated through FIG. 2.

Figure 2:
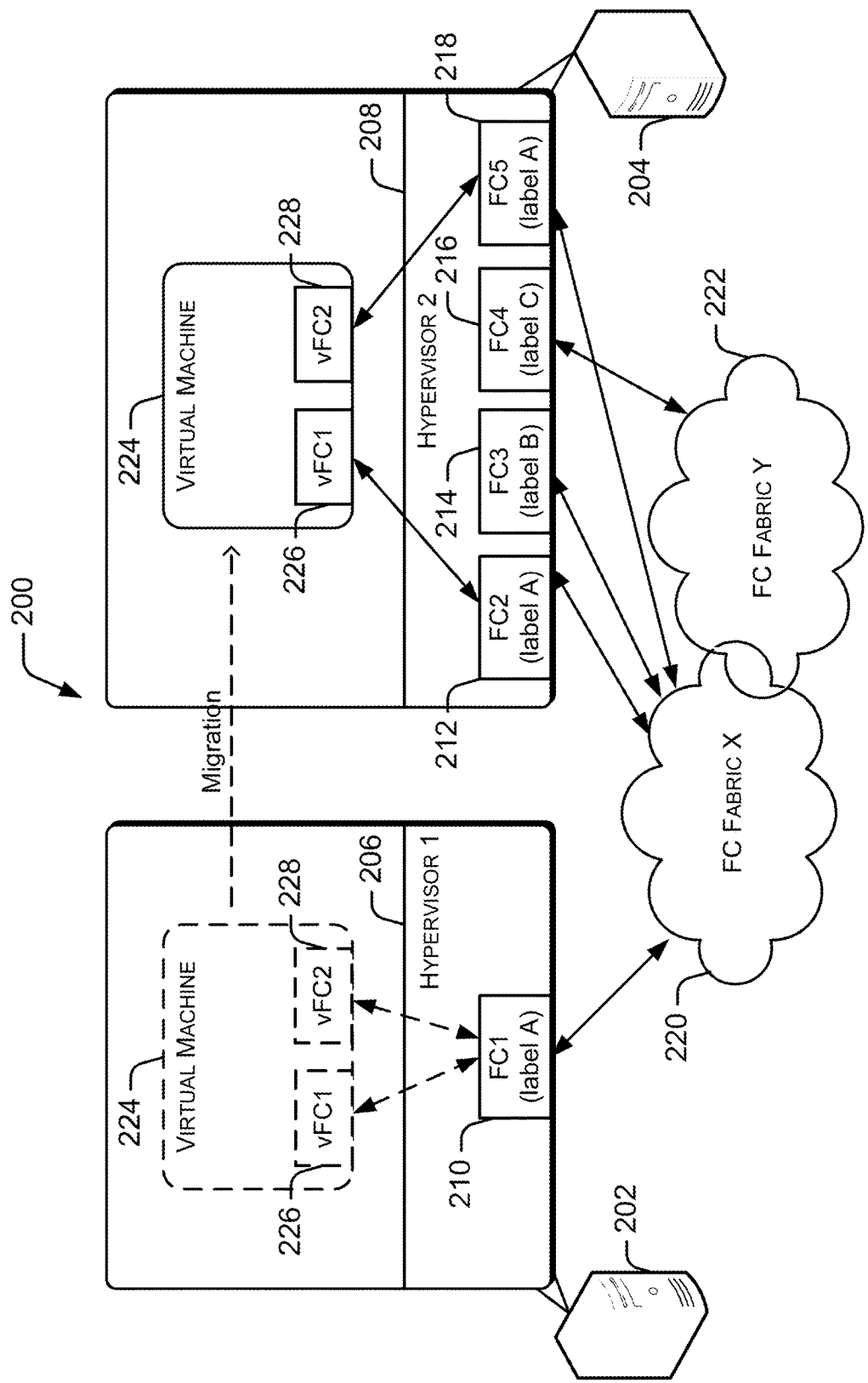
FIG. 2 illustrates VM migration in a storage network environment, according to an example implementation of the present subject matter.

FIG. 2 illustrates VM migration in a storage network environment 200, according to an example implementation of the present subject matter. The storage network environment 200 includes system 1 202 and system 2 204, similar to as shown in FIG. 1. System 1 202 includes hypervisor 1 206 that creates and manages VMs on system 1. Similarly, system 2 204 includes hypervisor 2 208 that creates and manages VMs on system 2. Further, system 1 202 includes one FC port, namely FC1 210, associated with hypervisor 1 206, and system 2 includes four FC ports, namely FC2 212, FC3 214, FC4 216, and FC5 218, associated with hypervisor 2 208. FC1 210, FC2 212, FC3 214, and FC5 218 are connected to FC fabric X 220, and FC4 216 is connected to FC fabric Y 222. FC fabric X 220 and FC fabric Y 222 overlap each other, as shown in FIG. 2. Thus, FC fabric X 220 and FC fabric Y 222 are part of the same FC fabric.

Further, FC1 210, FC2 212, and FC5 218 are assigned the same label, for example, "label A", as shown, as they are connected to FC fabric X and have the same bandwidth availability. FC3 214 is connected to FC fabric X, but has a lower bandwidth availability, therefore it is assigned a different label, for example, "label B", as shown. Further, FC4 216 is connected to FC fabric Y, but has a different lower bandwidth availability, therefore it is assigned another label, for example, "label C", as shown. In an example, FC4 216 may be assigned "label C" to set it aside for running test VMs.

Consider a case where a VM 224 on hypervisor 1 206 is associated with two vFCs, namely vFC1 226 and vFC2 228, and vFC1 226 and vFC2 228 are supported by FC1 210 label as "label A". For migrating the VM 224, hypervisor 2 208 identifies label A as the label associated with FC1 210 supporting vFC1 226 and vFC2 228 prior to migration of the VM 224. Hypervisor 2 then identifies FC2 212 and FC5 218 as the eligible destination FC ports, as they are assigned with label A. After identifying FC2 212 and FC5 218 as the eligible destination FC ports, hypervisor 2 208 may place vFC1 226 on FC2 212 and place vFC2 228 on FC5 218, as shown in FIG. 2. In other words, hypervisor 2 assigns FC2 212 to vFC1 226 and assigns FC5 218 to vFC 228, instead of assigning FC2 212 to both vFC1 226 and vFC2 228 or assigning FC5 218 to both vFC1 226 and vFC2 228. Thus, one eligible destination FC port, from among two or more eligible destination FC ports, is not consecutively assigned to any two virtual initiator ports of the migrating VM. Such a placement of vFCs of the migrating VM helps in preventing a single point of failure for the VM.

Figure 3:
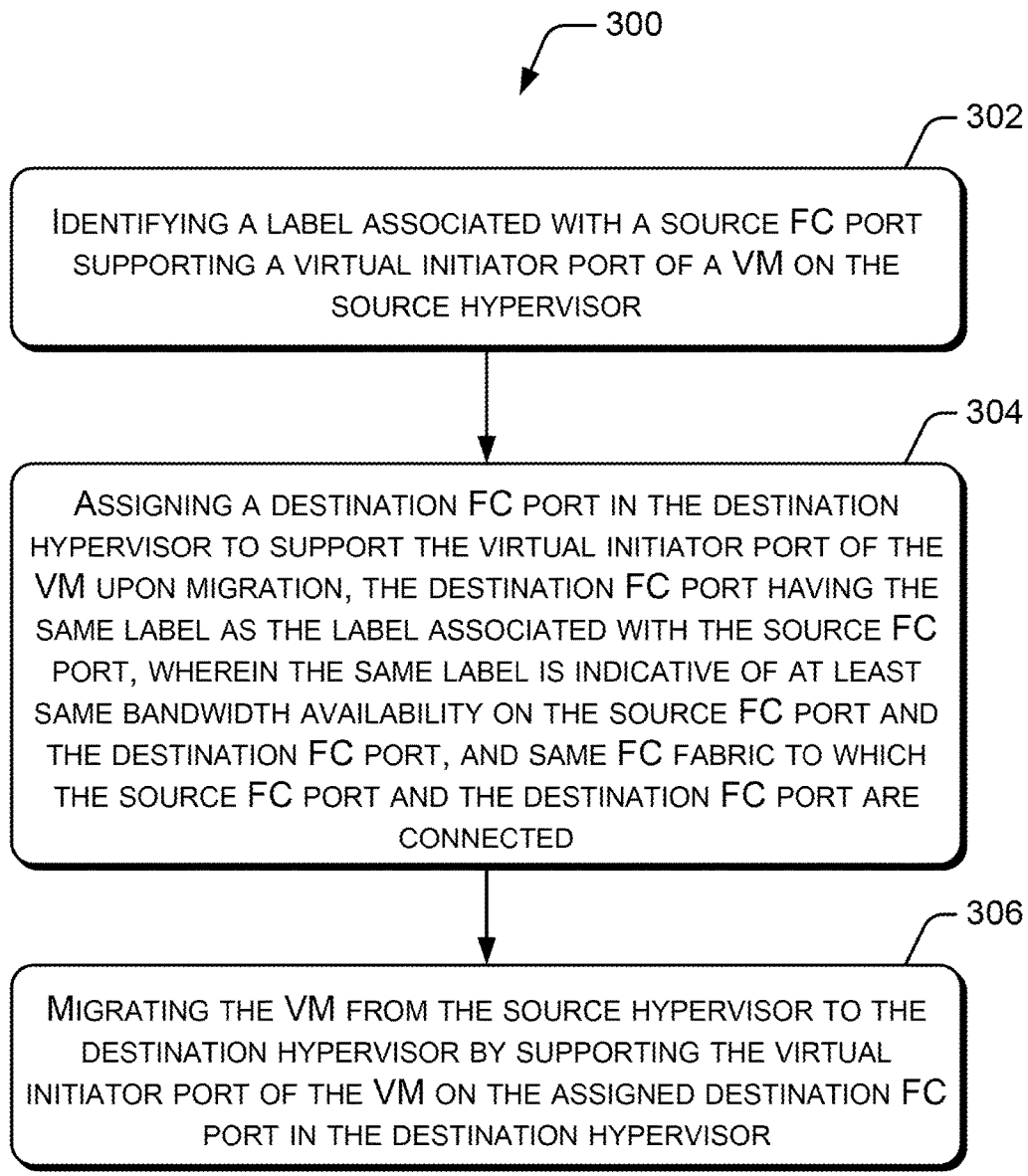
FIG. 3 illustrates a method for VM migration from a source hypervisor to a destination hypervisor in a storage network environment, according to an example implementation of the present subject matter.

FIG. 3 illustrates a method 300 for VM migration from a source hypervisor to a destination hypervisor in a storage network environment, according to an example implementation of the present subject matter. The order in which the method 300 is described is not intended to be construed as a limitation, and any number of the described method blocks can be combined to implement the method 300. Furthermore, the method 300 can be implemented by processor(s) or computing device(s) through any suitable hardware, a non-transitory machine readable medium, or combination thereof. Further, although the method 300 is described in context of the aforementioned host computing system of the storage network environment 100, other suitable computing devices or systems may be used for execution of the method 300. It may be understood that processes involved in the method 300 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 3, at block 302, a label associated with a source FC port supporting a virtual initiator port of a VM on the source hypervisor is identified. The label associated with the source FC port is identified by the destination hypervisor to which the VM is to be migrated. For the identification of the label, the source hypervisor sends at least the label of the source FC port to the destination hypervisor.

At block 304, a destination FC port in the destination hypervisor is assigned to support the virtual initiator port of the VM upon migration. The destination FC port has the same label as the label associated with the source FC port. Further, as described earlier, the same label is indicative of at least the same bandwidth availability on the source FC port and the destination FC port, and the same FC fabric to which the source FC port and the destination FC port are connected. The destination FC port is assigned by the destination hypervisor. The destination FC port is assigned in order to migrate the VM to the destination hypervisor.

At block 306, the VM is migrated from the source hypervisor to the destination hypervisor by supporting the virtual initiator port of the VM on the assigned destination FC port in the destination hypervisor. The VM migration is completed by the destination hypervisor.

Figure 4:
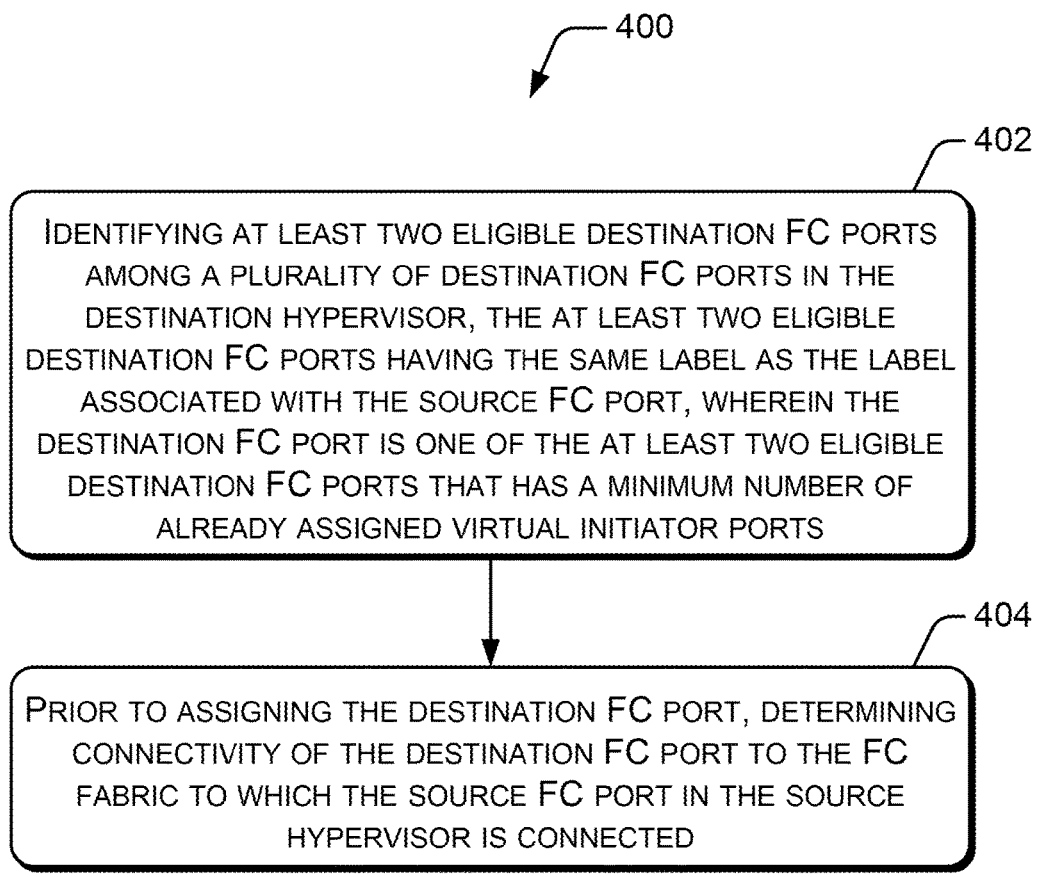
FIG. 4 illustrates a method for VM migration from a source hypervisor to a destination hypervisor in a storage network environment, according to an example implementation of the present subject matter.

FIG. 4 illustrates a method 400 for VM migration from a source hypervisor to a destination hypervisor in a storage network environment, according to an example implementation of the present subject matter. The order in which the method 400 is described is not intended to be construed as a limitation, and any number of the described method blocks can be combined to implement the method 400. Furthermore, the method 400 can be implemented by processor(s) or computing device(s) through any suitable hardware, a non-transitory machine readable medium, or combination thereof. Further, although the method 400 is described in context of the aforementioned host computing system of the storage network environment 100, other suitable computing devices or systems may be used for execution of the method 400. It may be understood that processes involved in the method 400 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 4, at block 402, at least two eligible destination FC ports among a plurality of destination FC ports in the destination hypervisor are identified, where the at least two eligible destination FC ports have the same label as the label associated with the source FC port. The destination FC port that is assigned to support the virtual initiator port of the VM is one of the at least two eligible destination FC ports that has a minimum number of already assigned virtual initiator ports. This helps in distributing the workloads on the eligible destination FC ports evenly, such that one eligible destination FC port is not loaded with all or a substantially large number of virtual initiator ports with respect to other eligible destination FC ports.

Further, at block 404, connectivity of the destination FC port to the FC fabric to which the source FC port in the source hypervisor is connected is determined prior to assigning the destination FC port to support the virtual initiator port of the VM. The connectivity of the destination FC port to the FC fabric is determined by the destination hypervisor. This determination helps in preventing placement of a virtual initiator port on a destination FC port that is labelled incorrectly with respect to connectivity to the same FC fabric.

Figure 5:
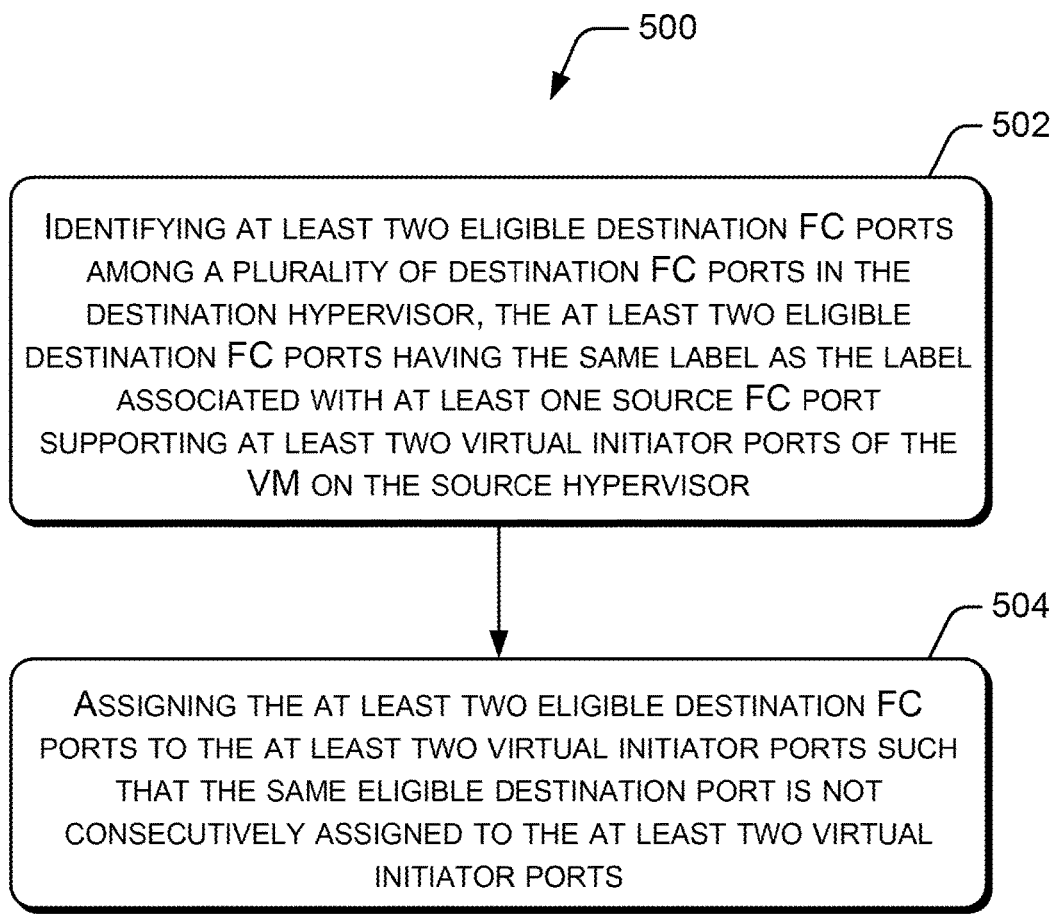
FIG. 5 illustrates a method for VM migration from a source hypervisor to a destination hypervisor in a storage network environment, according to an example implementation of the present subject matter.

FIG. 5 illustrates a method 500 for VM migration from a source hypervisor to a destination hypervisor in a storage network environment, according to an example implementation of the present subject matter. The order in which the method 500 is described is not intended to be construed as a limitation, and any number of the described method blocks can be combined to implement the method 500. Furthermore, the method 500 can be implemented by processor(s) or computing device(s) through any suitable hardware, a non-transitory machine readable medium, or combination thereof. Further, although the method 500 is described in context of the aforementioned host computing system of the storage network environment 100, other suitable computing devices or systems may be used for execution of the method 500. It may be understood that processes involved in the method 500 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 5, at block 502, at least two eligible destination FC ports among a plurality of destination FC ports in the destination hypervisor are identified, where the at least two eligible destination FC ports have the same label as the label associated with the at least one source FC port supporting the at least two virtual initiator ports. At block 504, the at least two eligible destination FC ports are assigned to the at least two virtual initiator ports such that the same eligible destination port is not consecutively assigned to the at least two virtual initiator ports. Such a placement of virtual initiator ports of the migrating VM helps in preventing a single point of failure for the VM.

Figure 6:
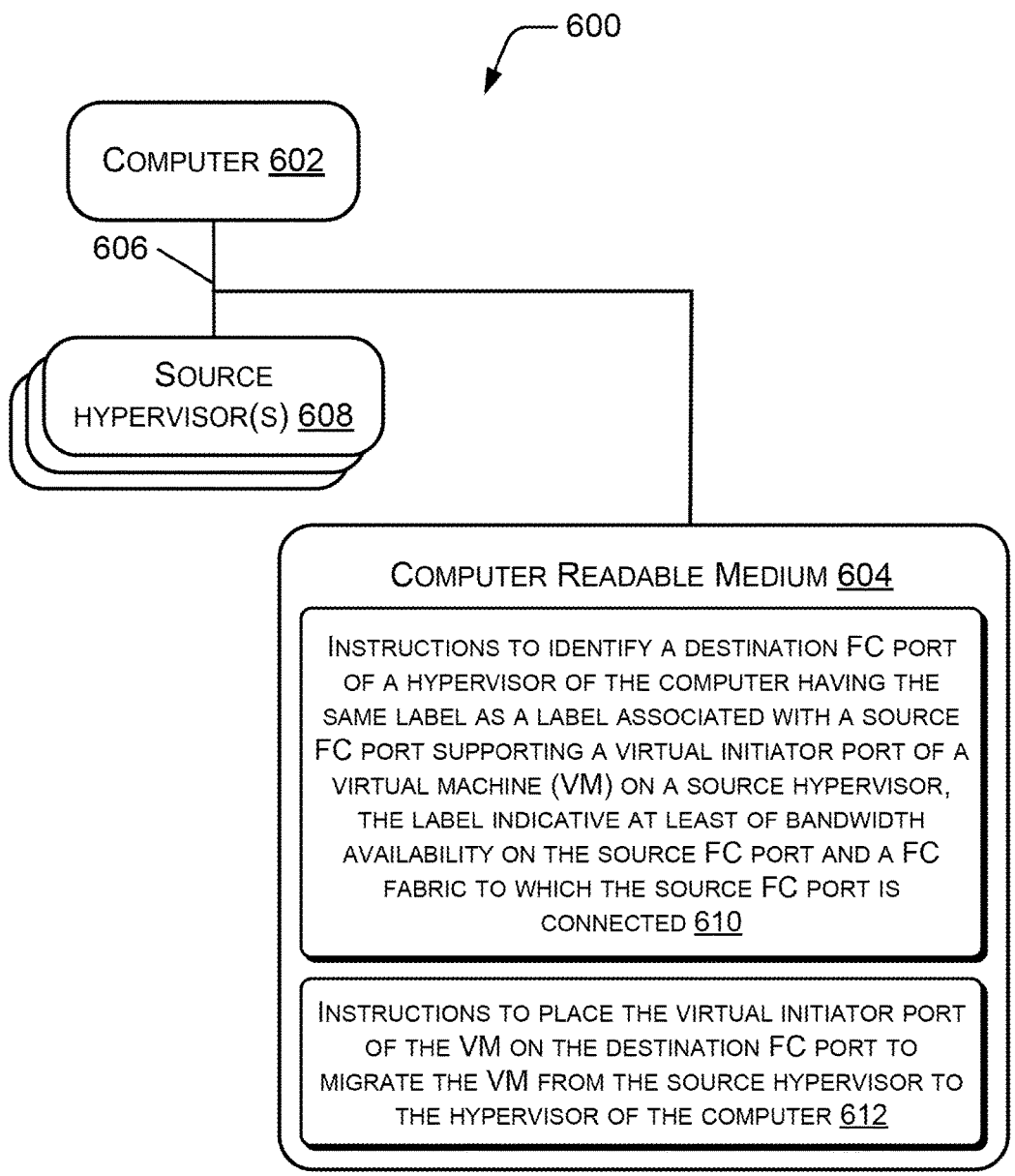
FIG. 6 illustrates a system environment, according to an example implementation of the present subject matter.

FIG. 6 illustrates a system environment 600, according to an example implementation of the present subject matter. In an example implementation, the system environment 600 includes a computer 602 communicatively coupled to a non-transitory computer readable medium 604 through a communication link 606. The computer 602 has one or more processing resources for fetching and executing computer-readable instructions from the non-transitory computer readable medium 604.

In an example implementation, the computer 602 may be a host computer that hosts a destination hypervisor to which a VM is to be migrated from a source hypervisor. Thus, the computer 602 and the non-transitory computer readable medium 604 are also communicatively coupled to source hypervisor(s) 608, for migration of a VM from the source hypervisor(s) 608 to the destination hypervisor of the computer 602.

The non-transitory computer readable medium 604 can be, for example, an internal memory device or an external memory device. In an example implementation, the communication link 606 may be a direct communication link, such as any memory read/write interface. In another example implementation, the communication link 606 may be an indirect communication link, such as a network interface. In such a case, the computer 602 can access the non-transitory computer readable medium 604 through a network (not shown). The network may be a single network or a combination of multiple networks and may use a variety of different communication protocols.

In an example implementation, the non-transitory computer readable medium 604 includes a set of computer readable instructions for migration of VMs from a source hypervisor(s) 608 to the destination hypervisor of the computer 602. The set of computer readable instructions can be accessed by the computer 602 through the communication link 606 and subsequently executed to perform acts for migration of VMs.

Referring to FIG. 6, in an example, the non-transitory computer readable medium 604 includes instructions 610 that cause the computer 602 to identify a destination FC port of a hypervisor of the computer 602 having same label as a label associated with a source FC port supporting a virtual initiator port of a VM on the source hypervisor 608. The same label is indicative of at least same bandwidth availability on the source FC port and the destination FC port, and same FC fabric to which the source FC port and the destination FC port are connected. The non-transitory computer readable medium 604 includes instructions 612 that cause the computer 602 to place the virtual initiator port of the VM on the destination FC port to migrate the VM from the source hypervisor 608 to the hypervisor of the computer 602.

In an example implementation, the non-transitory computer readable medium 604 may further include instructions that cause the computer 602 to determine connectivity of the destination FC port to the FC fabric to which the source FC port in the source hypervisor is connected prior to placing the virtual initiator port of the VM on the destination FC port.

In an example implementation, the non-transitory computer readable medium 604 may further include instructions that cause the computer 602 to identify at least two eligible destination FC ports among a plurality of destination FC ports in the hypervisor, where the at least two eligible destination FC ports have the same label as the label associated with at least one source FC port on the source hypervisor supporting at least two virtual initiator ports of the VM. In an example implementation, the non-transitory computer readable medium 604 may further include instructions that cause the computer 602 to place the at least two virtual initiator ports on the at least two eligible destination FC ports such that the same eligible destination FC port is not consecutively assigned to the at least two virtual initiator ports.

Although implementations for VM migration from a source hypervisor to a destination hypervisor in an NPIV-based storage network environment have been described in language specific to structural features and/or methods, it is to be understood that the present subject matter is not limited to the specific features or methods described. Rather, the specific features and methods are disclosed and explained as example implementations for VM migration from a source hypervisor to a destination hypervisor.

We claim:

1. A method, comprising:
   prior to assigning a plurality of labels, determining, by a computing system, a fibre channel (FC) fabric to which each of a plurality of FC ports is connected;
   assigning the plurality of labels to groups of FC ports based on bandwidth availability and fabric connections of FC ports, wherein each of the plurality of labels is an identifier assigned to a unique group of FC ports, wherein a first label is assigned only to a first group of FC ports that each have a first bandwidth availability and are each connected to a first FC fabric;
   executing a virtual machine (VM) on a source hypervisor using a virtual initiator port of the VM supported by a source FC port assigned the first label;
   after assigning the plurality of labels and prior to migration of the VM from the source hypervisor to a destination hypervisor:
      identifying, by the computing system, that the first label is associated with the source FC port supporting the virtual initiator port of the VM on the source hypervisor; and
      selecting, by the computing system, from a plurality of FC ports associated with the destination hypervisor, a destination FC port having a label matching the identified first label associated with the source FC port, wherein the selecting is based on comparing the identified first label to respective labels of the plurality of FC ports associated with the destination hypervisor;
   migrating, by the computing system, the VM from the source hypervisor to the destination hypervisor, wherein migrating the VM comprises placing the virtual initiator port of the VM on the selected destination FC port; and
   executing the VM on the destination hypervisor using the virtual initiator port of the VM supported by the selected destination FC port having the label matching the identified first label associated with the source FC port.

2. The method as claimed in claim 1, further comprising:
   identifying, by the computing system, at least two eligible destination FC ports among a plurality of destination FC ports in the destination hypervisor, the at least two eligible destination FC ports having the same label as the first label associated with the source FC port; and
   selecting, by the computing system, the destination FC port from among the at least two eligible destination FC ports that has a lower number of already assigned virtual initiator ports.

3. The method as claimed in claim 1, wherein the VM has at least two virtual initiator ports supported by the source FC port on the source hypervisor, the method further comprising:
   identifying, by the computing system, at least two eligible destination FC ports among a plurality of destination FC ports in the destination hypervisor, the at least two eligible destination FC ports having the same label as the first label associated with the source FC port; and
   assigning, by the computing system, the at least two eligible destination FC ports to the at least two virtual initiator ports such that one eligible destination port is not consecutively assigned to the at least two virtual initiator ports.

4. The method as claimed in claim 1, wherein the source FC port in the source hypervisor and the destination FC port in the destination hypervisor are connected to same FC storage area network (SAN) resources.

5. The method as claimed in claim 1, wherein, within each unique group of FC ports, the FC ports each have a same bandwidth availability and are connected to a same FC fabric.

6. The method as claimed in claim 5, wherein each of the first group of FC ports has:
   a same vendor associated with the source FC port and the destination FC port,
   a same speed associated with the source FC port and the destination FC port, and
   a same load-based priority associated with the source FC port and the destination FC port.

7. The method as claimed in claim 1, wherein each of the plurality of labels is a unique alphanumeric tag.

8. The method as claimed in claim 1, wherein the destination hypervisor is part of the computing system, and wherein the source hypervisor is part of another computing system.

9. A computing system comprising:
   a processor; and
   a storage device comprising instructions executable by the processor to:
      prior to assigning a plurality of labels, determine a fibre channel (FC) fabric to which each of a plurality of FC ports is connected;
      assign the plurality of labels to groups of FC ports based on bandwidth availability and fabric connections of FC ports, wherein each of the plurality of labels is assigned to a unique group of FC ports, wherein a first label of the plurality of labels is assigned only to a plurality of FC ports that each have a first bandwidth availability and are each connected to a first FC fabric;
      execute a virtual machine (VM) on a source hypervisor using a virtual initiator port of the VM supported by a source FC port assigned the first label;
      after assigning the plurality of labels and prior to migration of the VM from the source hypervisor to a destination hypervisor:
         receive, from the source hypervisor, the first label assigned to the source FC port; and
         select, from a plurality of destination FC ports associated with the destination hypervisor, a destination FC port having a label that matches the received first label based on comparing the received first label to respective labels of the plurality of destination FC ports;

migrate the VM from the source hypervisor to the destination hypervisor, wherein the virtual initiator port of the migrated VM is placed on the selected destination FC port; and execute the VM on the destination hypervisor using the virtual initiator port of the VM supported by the selected destination FC port having the label matching the received first label assigned to the source FC port.

10. The system as claimed in claim 9, wherein the instructions are executable to:

identify at least two eligible destination FC ports among the plurality of destination FC ports associated with the destination hypervisor, the at least two eligible FC ports having labels that match the received first label, wherein the selecting comprises selecting the destination FC port from among the at least two eligible destination FC ports that has a lower number of previously placed virtual initiator ports.

11. The system as claimed in claim 9, wherein the instructions are executable to:

identify at least two eligible destination FC ports among the plurality of FC ports associated with the destination hypervisor, the at least two eligible destination FC ports having labels that match the received first label; and place the at least two virtual initiator ports on the at least two eligible destination FC ports such that one eligible destination FC port is not consecutively assigned to the at least two virtual initiator ports.

12. The system as claimed in claim 9, wherein the source FC port and the selected destination FC port are connected to same FC storage area network (SAN) resources.

13. The system as claimed in claim 9, wherein the first label is a unique alphanumeric tag.

14. A non-transitory computer-readable medium comprising computer-readable instructions, which, when executed by a computer, cause the computer to:

prior to assigning a plurality of labels, determine a fibre channel (FC) fabric to which each of a plurality of FC ports is connected;

assign the plurality of labels to groups of FC ports based on bandwidth availability and fabric connections of FC ports, wherein each of the plurality of labels is assigned to a unique group of FC ports, wherein a first label of the plurality of labels is assigned only to a plurality of FC ports that each have a first bandwidth availability and are each connected to a first FC fabric;

execute a virtual machine (VM) on a source hypervisor using a virtual initiator port of the VM supported by a source FC port assigned the first label;

after assigning the plurality of labels and prior to migration of the VM from the source hypervisor to a destination hypervisor:

identify that the first label associated with the source FC port supporting the virtual initiator port of the VM on the source hypervisor; and select a destination FC port from a plurality of destination FC ports associated with a destination hypervisor, the selecting based on comparing the identified first label to respective labels of the plurality of FC ports associated with the destination hypervisor and determining that the selected destination FC port has a label that matches the identified first label of the source FC port;

migrate the VM from the source hypervisor to the destination hypervisor of the computer, wherein the virtual initiator port of the migrated VM is placed on the selected destination FC port; and execute the VM on the destination hypervisor using the virtual initiator port of the VM supported by the selected destination FC port having the label matching the identified first label of the source FC port.

15. The non-transitory computer-readable medium as claimed in claim 14, wherein the selected destination FC port is selected based on determining that the selected destination FC port has a lower number of previously placed virtual initiator ports than another destination FC port of the plurality of destination FC ports.

16. The non-transitory computer-readable medium as claimed in claim 14, wherein the instructions when executed by the computer cause the computer to:

identify at least two eligible destination FC ports among the plurality of destination FC ports, the at least two eligible destination FC ports having labels that match the identified first label of the source FC port; and place the at least two virtual initiator ports on the at least two eligible destination FC ports such that one eligible destination FC port is not consecutively assigned to the at least two virtual initiator ports.

17. The non-transitory computer-readable medium as claimed in claim 14, wherein the first label is a unique alphanumeric tag.

* * * * *